United States Patent [19]
Lisec

[11] Patent Number: 6,077,018
[45] Date of Patent: Jun. 20, 2000

[54] DEVICE FOR SORTING OF GLASS BLANKS

[76] Inventor: Peter Lisec, Bahnhofstrasse 43, A-3363 Amstetten-Hausmening, Austria

[21] Appl. No.: 08/888,093

[22] Filed: Jul. 3, 1997

[30] Foreign Application Priority Data

Jul. 3, 1996 [AT] Austria ..................................... 1178/96

[51] Int. Cl.[7] ....................................................... B07C 5/02
[52] U.S. Cl. ........................... 414/269; 414/405; 414/778
[58] Field of Search ............................. 198/405; 414/778, 414/331.06, 331.09, 277, 278, 268, 269, 271; 211/41.14

[56] References Cited

U.S. PATENT DOCUMENTS

| | | | |
|---|---|---|---|
| 3,966,048 | 6/1976 | Nunes et al. ............................... | 209/82 |
| 4,886,410 | 12/1989 | Lisec ......................................... | 414/27 |
| 5,209,627 | 5/1993 | Lisec ......................................... | 414/399 |
| 5,280,832 | 1/1994 | Lisec ..................................... | 198/626.5 |

FOREIGN PATENT DOCUMENTS

| | | |
|---|---|---|
| 0 048 334 | 3/1982 | European Pat. Off. . |
| 0 477 163 | 3/1992 | European Pat. Off. . |
| 0 620 171 | 10/1994 | European Pat. Off. . |
| 91 04 816 | 9/1991 | Germany . |
| 43 05 826 | 10/1993 | Germany . |
| WO 95/25688 | 9/1995 | WIPO . |

*Primary Examiner*—Thomas J. Brahan
*Attorney, Agent, or Firm*—Young & Thompson

[57] ABSTRACT

In a sorting unit for glass blanks, next to a device (1) for righting of glass blanks delivered horizontally, there is buffer storage (20) on the side opposite conveyor (10) by which glass blanks are moved to compartmented cars (60) in which they are sorted are deposited. Buffer storage (20) is a compartmented shelf with compartments formed by several tensioned cables. In buffer storage (20) glass blanks can be deposited without hindering the remaining sorting process. To align the compartments of the compartmented shelf of buffer storage (20) relative to the conveyor plane of the device (1) for righting of glass blanks, compartmented car (21) of buffer storage (20) can be adjusted relative to its base frame (22) transversely to the conveyor plane.

14 Claims, 6 Drawing Sheets

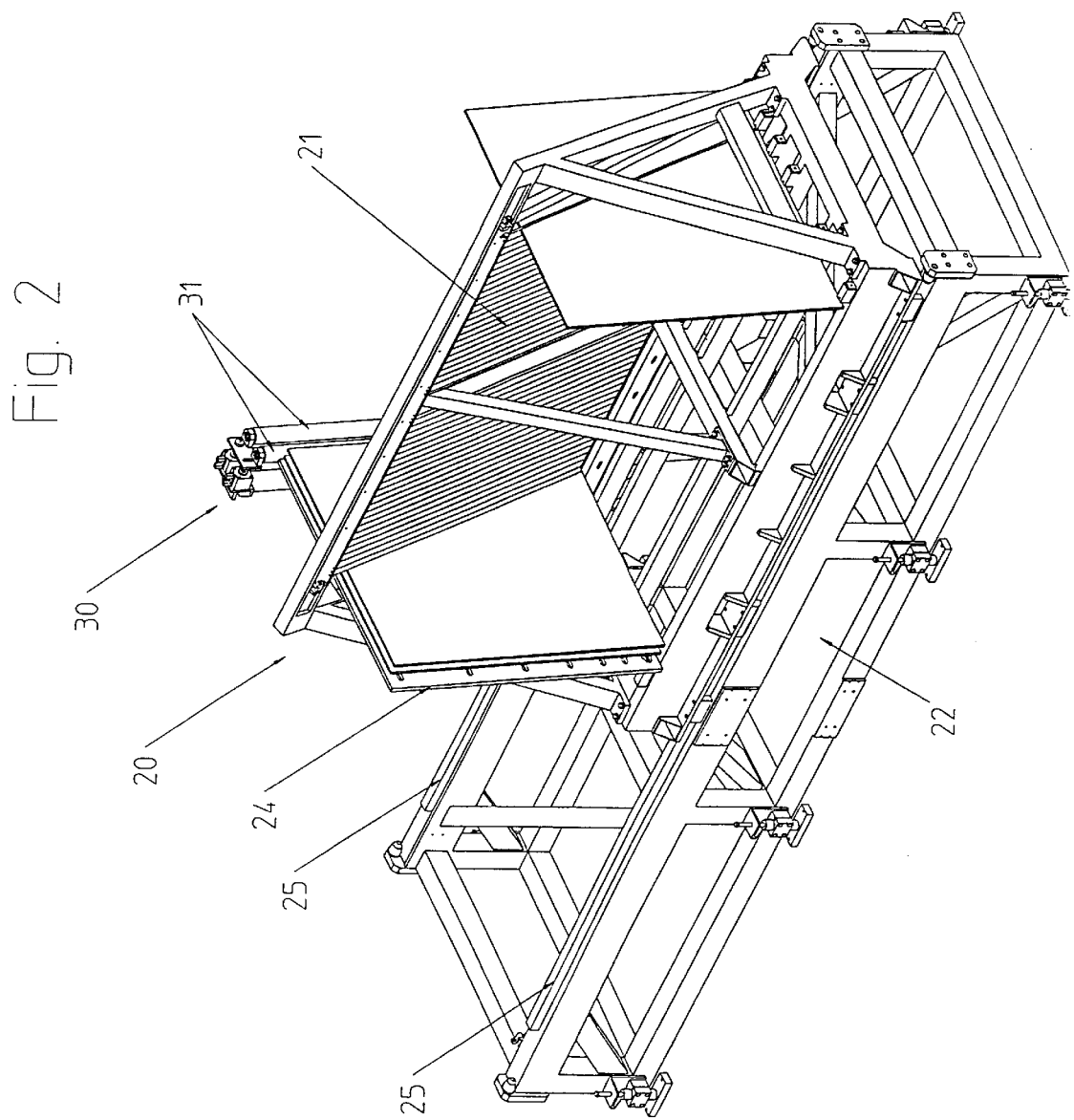

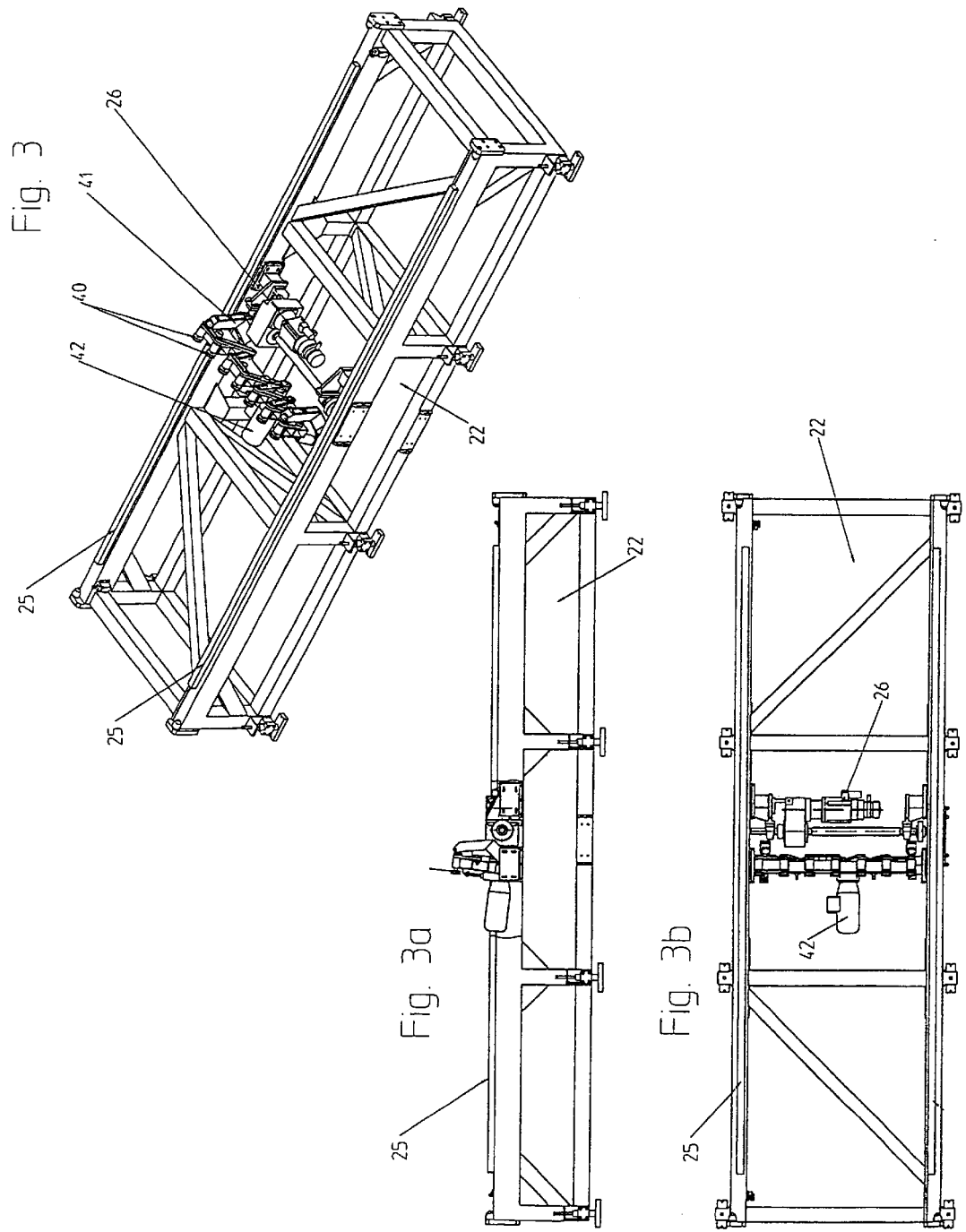

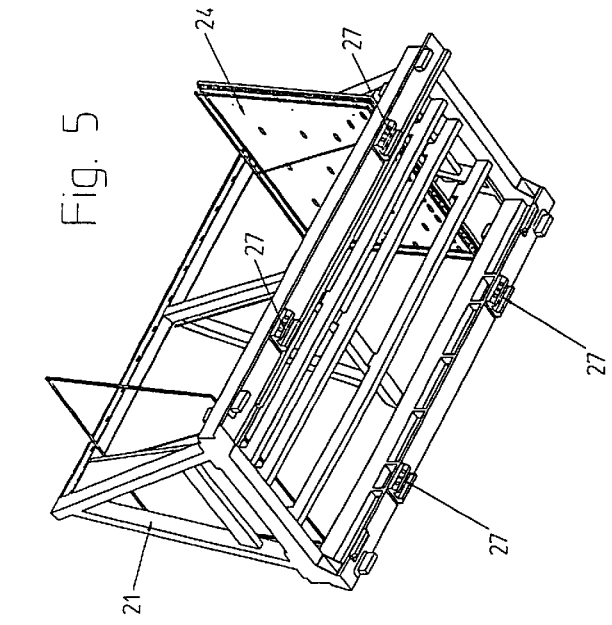
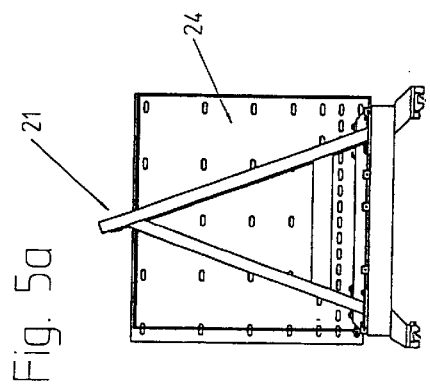
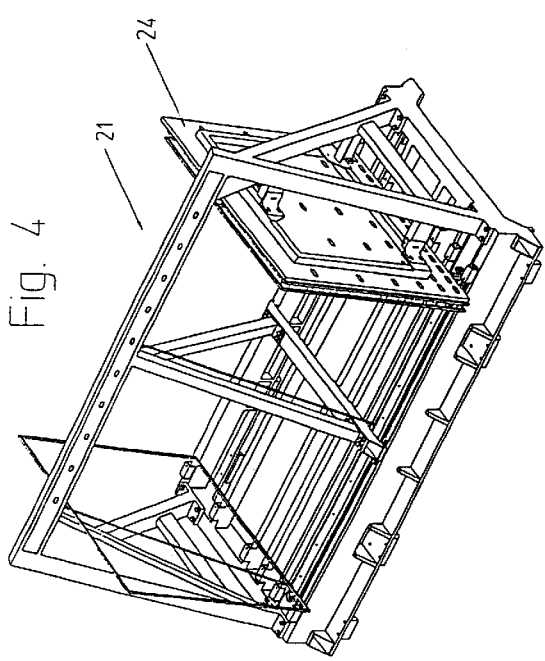
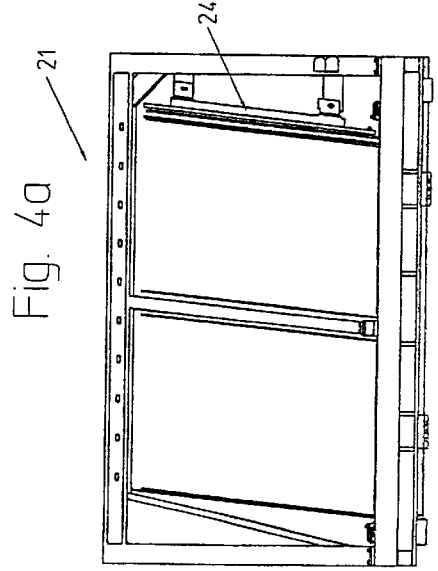

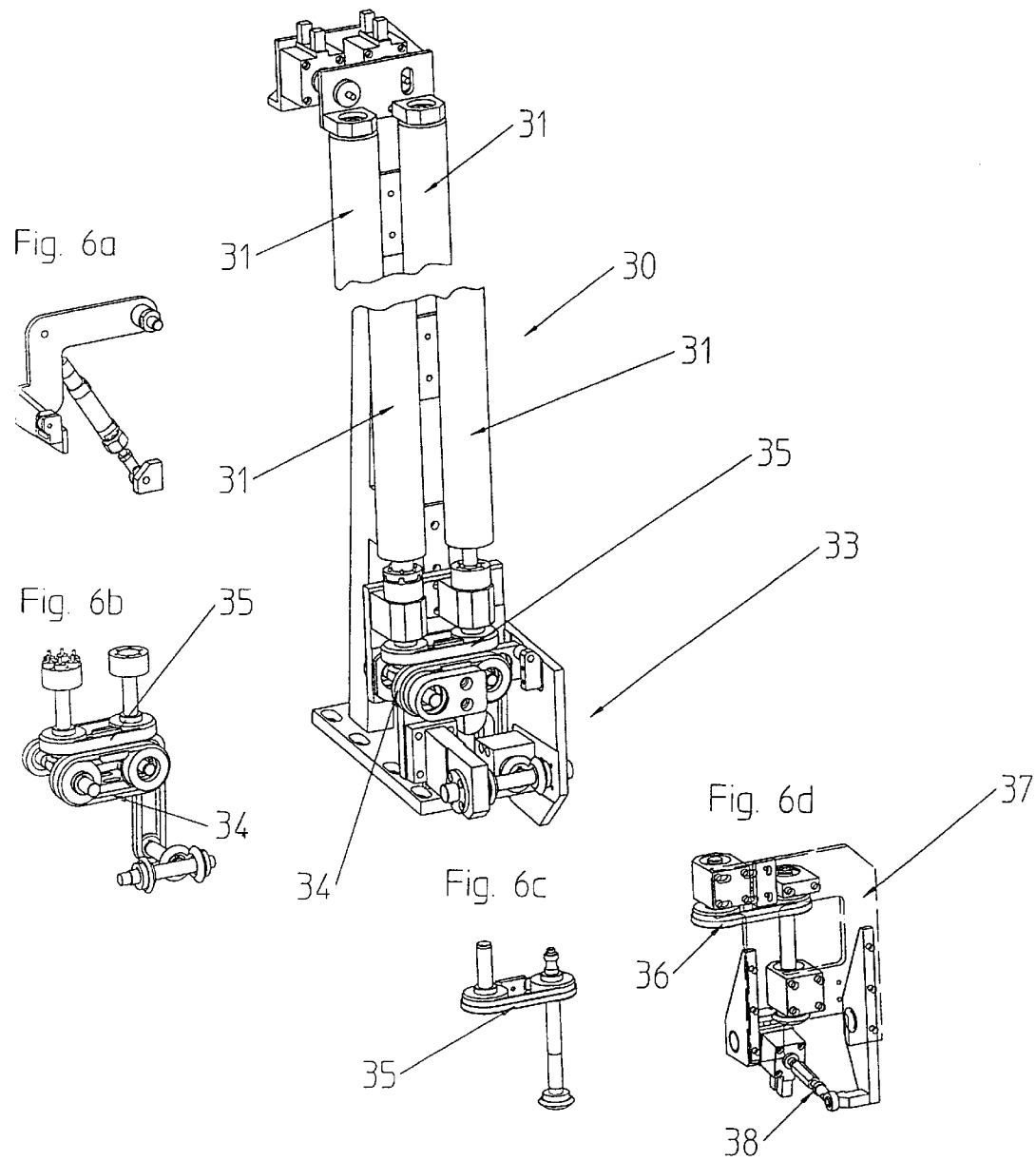

DEVICE FOR SORTING OF GLASS BLANKS

BACKGROUND OF THE INVENTION

The invention relates to a device for sorting of glass blanks, with a lifting means to set essentially upright glass blanks delivered horizontally, and with conveyor means by which the righted glass blanks are delivered to compartmented cars according to arbitrary ordering criteria and are deposited in them.

A device of this type is known from EP 477 163 A. The known sorting device, in which a plurality of compartmented cars is used, is used preferably in conjunction with a glass cutting unit, as is known for example from DE 43 05 826 A.

The problem in the known sorting devices is that sorting out unneeded glass blanks (residue) and damaged glass blanks requires manual intervention. Furthermore, it had been found to be disadvantageous that problems often arise when it takes a longer time until several glass blanks which belong to a certain group according to chosen ordering criteria (for example, two blanks for producing an insulated glass pane) are delivered by the glass cutting unit.

SUMMARY OF THE INVENTION

The object of the invention is to improve a device for sorting of glass blanks of the initially mentioned type such that unneeded or damaged glass blanks can be easily sorted out and that additional buffer capacity is available.

In the device as claimed in the invention a conveyor means which delivers the glass blanks to the compartmented cars is not assigned to the lifting means for setting upright glass blanks delivered horizontally, as known from EP 477 163 A, on only one side, but a buffer storage, for example, in the form of a compartmented shelf, is assigned to the other end of the lifting means. In this way a stowage space is obtained in which, without hindering the sorting process proper, glass blanks can wait until the next blank or other blanks which belong to a group of at least two glass blanks according to a certain ordering criterion are delivered.

This buffer storage also makes it possible to set up one of its compartments as a means for through-conveyance of glass blanks so that damaged and/or unneeded blanks (residues) can be conveyed into a collecting tank for unneeded glass blanks or damaged glass.

Other details and features of the invention follow from the following description of one preferred embodiment of the invention which is especially well suited to being combined with a glass cutting unit, as is known for example from DE 43 05 826 A.

BRIEF DESCRIPTION OF THE DRAWINGS

FIG. 2 shows a buffer storage in an oblique view,

FIG. 3 shows the underframe of the buffer storage with a conveyor means,

FIGS. 3a and 3b shows the underframe in other views,

FIGS. 4, 4a and 5, 5a show the movable part of the buffer storage in different views, FIG. 6 shows one embodiment for a removal conveyor located between the device for setting upright the glass blanks and the buffer storage, FIGS. 6a through 6d show details of the removal conveyor and FIG. 7 in an overhead view shows one embodiment of the devices as claimed in the invention with assigned system parts.

DESCRIPTION OF PREFERRED EMBODIMENTS

Figure 1:
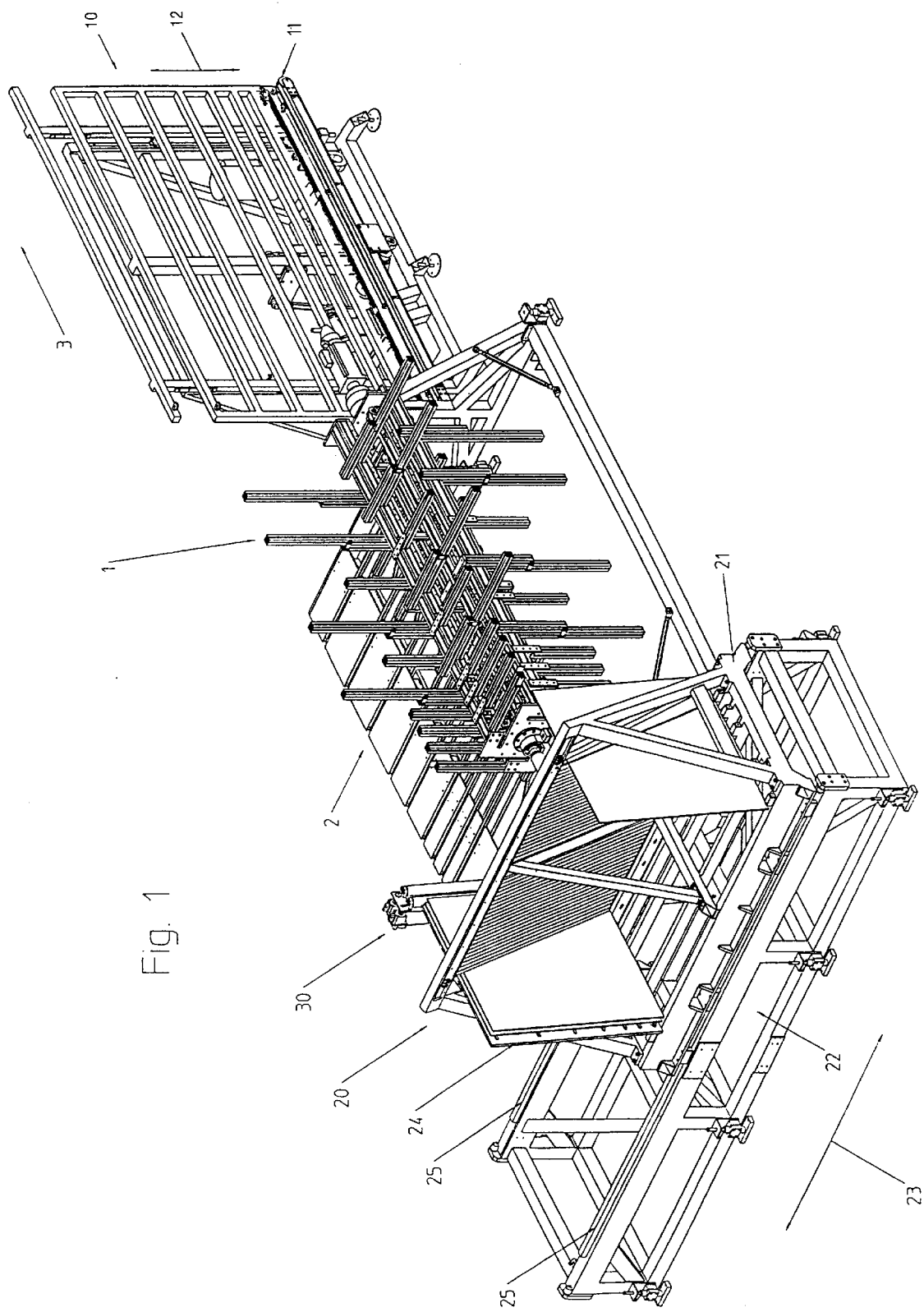
FIG. 1 shows a sorting means as claimed in the invention in an oblique view.

Glass blanks are delivered horizontally to means 1 shown in FIG. 1 (lifting means) for righting in the direction of arrow 2 from a glass cutting unit, for example glass cutting unit 50 (FIG. 7) of a design known from DE 43 05 826A. Normally the glass blanks, as is known from DE 43 05 826 A, are moved onto intermediate conveyor 10 after righting in the direction of arrow 3 in FIG. 1. Intermediate conveyor 10 on its lower end has conveyor means, for example, conveyor belt 11, and can be adjusted up and down in the direction of double arrow 12. From intermediate conveyor 10 glass blanks, as is known in EP 477 163 A, are transported in the direction of arrow 3 to one of several compartmented cars 60 (FIG. 7) or otherwise further processed. Because intermediate conveyor 10 is vertically adjustable, glass blanks, after they have been moved from means 1 onto intermediate conveyor 10, can be lowered such that their lower horizontal edge is at the level of the lower end of the compartments in compartmented car 60.

As is apparent from the overall view in FIG. 1, on the side opposite intermediate conveyor 10 next to device 1 for righting glass blanks there can be buffer storage 20 either directly or with the interposition of a removal conveyor 30 (see FIG. 6) to which another intermediate is conveyor 70 similar to intermediate conveyor 10, for example, consisting of a roller support wall and horizontal conveyor (conveyor belt or roller line), can be connected on the upstream side. This buffer storage 20 is made as a compartmented shelf in the embodiment. Buffer storage 20 has car 21 which can be moved on underframe 22 in the direction of double arrow 23. In car 21 there are compartments (for the sake of clarity only individual parts are shown) which are formed by tensioned cables (preferably equipped with sleeves according to EP 477 163 A). One compartment, for example, the first compartment, has support wall 24 equipped with rollers and is thus made as a compartment for conveyance of glass blanks through buffer storage 20.

Car 21 can be adjusted relative to its underframe 22, as mentioned, in order to align the compartment desired at the time relative to the conveyor plane of means 1 or removal conveyor 30 such that a glass blank can be transported into a selected compartment of buffer storage 20 and deposited in the compartmented shelf which is used as buffer storage 20.

To adjust car 21 of buffer storage 20 relative to its underframe 22, car 21 can be guided on sliding blocks 27 (FIG. 5) on guide rails 25, drive motor 26 which engages one (or two) racks mounted on car 21 by one (or two) pinions being provided for drive purposes.

Between lifting means 1 and buffer storage 20 there is removal conveyor 30 with two support rolls 31 which can be rotary-driven, which are oriented parallel to the conveyor plane, and lying on which glass blanks are moved. On the lower end of support rolls 31, flush with the linear conveyor of lifting means 1, there is auxiliary lifting means 33 which engages the lower edge of the glass blank. In the embodiment auxiliary conveyor means 33 consists of continuous conveyor belt 34 which engages the glass blank underneath, and just above the latter belt, short continuous conveyor belts 35, 36 which engage the glass blank from the front and back. One continuous conveyor belt 36 (FIG. 6d) is mounted on swivelling frame 37, so that it can be placed using hydraulic cylinder 38 on the surface of the glass blank facing it. Auxiliary conveyor 33 ensures transport of a glass blank from lifting means 1 into one of the compartments of compartmented shelf 20, even if the glass blanks are short. In particular, return transport of interim-stored glass blanks via lifting means 1 onto intermediate conveyor 10 during final sorting is facilitated.

As mentioned, between lifting means 1 and removal conveyor 30 with support rolls 31 there can be intermediate conveyor 70 (FIG. 7) when three-dimensional requirements make this helpful.

Conveyance of glass blanks into a selected compartment of buffer storage 20 or conveyance of a glass blank along support wall 24 by buffer conveyor 20 is supported by transport rollers 40 which can be driven by motor 42 and which are mounted in base frame 21 of compartmented shelf 20. These transport rollers 40 are mounted on common beam 41 such that they are to be raised into their action position by swivelling beam 41, when a glass blank is to be transported into a compartment of buffer storage 20 or is to be conveyed through by buffer storage 20. To avoid hindering the adjustment of car 21 of buffer storage 20, transport rollers 40 can be lowered out of their action position.

On the outlet side of support wall 24 on one end of car 21 of buffer storage 20 there can be another conveyor means 80 with lower support rollers which can be driven in order to transport glass blanks (residue, damaged blanks) conveyed by buffer storage 20 on to collecting tank 90 for broken glass. The support wall of conveyor means 80 can be tilted forward using a hydraulic cylinder to dump glass blanks into collecting tank 90.

Figure 7:
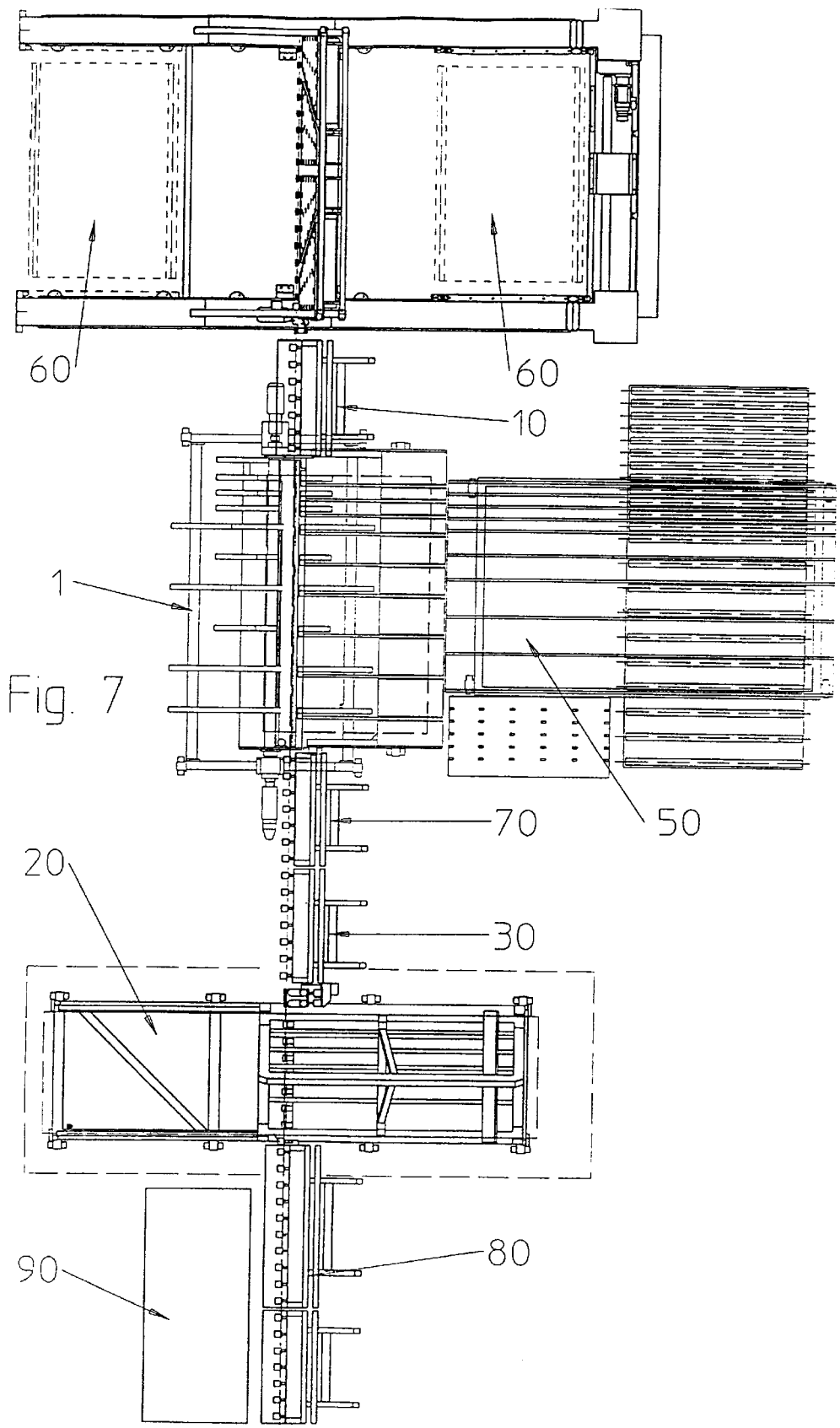

FIG. 7 shows in an overhead view a unit for sorting of glass blanks which contains the means as claimed in the invention for sorting of glass blanks. FIG. 7 shows that means 1 for righting the glass blanks delivered horizontally is located next to the discharge-side end of glass cutting table 50. On one side of means 1 for righting of glass blanks there is intermediate conveyor 10 which deposits the glass blanks in one of compartmented cars 60 prepared on its discharge side, sorted according to any ordering criteria.

On the side of means 1 for righting of glass panes opposite intermediate conveyor 10 there is intermediate conveyor 70 which can be made similarly to intermediate conveyor 10. Adjacent to intermediate conveyor 70 there is removal conveyor 30 which for example has the construction detailed in FIG. 6 through 6d. Following removal conveyor 30 there is buffer storage 20 made as a compartmented shelf.

On the side of buffer conveyor 20 opposite removal conveyor 30 there is conveyor means 80 with a support wall which can be tipped forward so that glass blanks which are standing on conveyor means 80 and which are leaning on its support wall can be tipped into collecting tank 90 located in front of conveyor means 80.

In summary one embodiment of the invention can be described as follows:

In a sorting unit for glass blanks, besides means 1 for righting of glass blanks delivered horizontally, there is buffer storage 20 on the side opposite conveyor 10 with which the glass blanks in compartmented cars 60 in which they are sorted are deposited. Buffer storage 20 is a compartmented shelf with compartments formed by several tensioned cables. In buffer storage 20 glass blanks can be deposited without hindering the remaining sorting process. To align the compartments of the compartmented shelf of buffer storage 20 relative to the conveyor plane of means 1 for erection of glass blanks, compartmented car 21 of buffer storage 20 can be adjusted relative to its base frame 22 transversely to the conveyor plane.

Wall 24 equipped with rollers is assigned to one of the compartments of buffer storage 20 so that damaged blanks or unneeded blanks (residues) can be conveyed through buffer storage 20 into collecting tank 90.

To ensure reliable transport of glass blanks from means 1 for righting of glass blanks into buffer storage 20, even if the blanks are small, between means 1 for righting of glass blanks and buffer storage 20 there is removal conveyor 30 which has two roughly vertical, rotary-driven rollers 31 and on the lower end thereof auxiliary conveyor 33 with two conveyor means which engage the lower edge of the glass blank and which engage the surfaces of the glass blank.

What is claimed is:

1. In a device for sorting glass blanks, the device having a lifting apparatus that reorients a glass blank from substantially horizontal to substantially vertical, a compartmented shelf at a first side of the lifting apparatus into which a glass blank is deposited, and an intermediate conveyor between the lifting apparatus and the compartmented shelf that conveys a substantially vertical glass blank from the lifting apparatus to the compartmented shelf, the improvement comprising:

a buffer storage at a second side of the lifting apparatus opposite the first side and into which a glass blank is deposited, and compartments for glass blanks in said buffer storage and means for moving said compartments perpendicular to a plane of glass blank conveyance in the lifting apparatus.

2. The device of claim 1, in which the improvement further comprises at least one of said compartments that includes a support wall along which a glass blank is movable through said buffer storage from a first side of said buffer storage that receives a glass blank from the lifting apparatus to a second side of said buffer storage from which a glass blank can be retrieved.

3. The device of claim 1, in which the improvement further comprises a stationary support with rollers on which a glass blank moves through one of said compartments.

4. The device of claim 3, the improvement further comprising grooves in said rollers.

5. The device of claim 3, the improvement further comprising a common beam on which said rollers are mounted and a swivelling beam that moves said rollers into an operable position.

6. The device of claim 1, in which the improvement further comprises cables defining compartments for glass blanks in said buffer storage.

7. The device of claim 1, in which the improvement further comprises at least one compartment in said buffer storage that includes a support wall along which a glass blank is movable through said buffer storage from a first side of said buffer storage that receives a glass blank from the lifting apparatus to a second side of said buffer storage from which a glass blank can be retrieved.

8. The device of claim 1, in which the improvement further comprises a buffer conveyor between the lifting apparatus and said buffer storage that conveys a substantially vertical glass blank from the lifting apparatus to said buffer storage.

9. The device of claim 8, in which said buffer conveyor comprises a substantially vertical support roll which has on a lower end a further conveyor which supports a glass blank from underneath.

10. The device of claim 9, in which said buffer conveyor comprises two of said support rolls that are parallel to each other.

11. The device of claim 9, in which said further conveyor comprises a first belt that supports a glass blank from underneath and two further belts that support a side of a glass blank at a top and a bottom thereof.

12. The device of claim 11, in which one of said two further belts is adjustable in a direction transverse to a plane of conveyance of the glass blank.

13. The device of claim 8, in which the improvement further comprises a second intermediate conveyor between the lifting apparatus and said buffer conveyor.

14. The device of claim 1, in which the improvement further comprises a collector tank conveyor that is located at a side of said buffer storage opposite a side of said buffer storage adjacent to the lifting apparatus and that receives a glass blank from said buffer storage, said collector tank conveyor having a tiltable support wall that dislodges a glass blank carried in said collector tank conveyor.

* * * * *